United States Patent
Priyanto et al.

(10) Patent No.: US 11,782,121 B2
(45) Date of Patent: Oct. 10, 2023

(54) METHOD AND DEVICE FOR POSITIONING UTILIZING BEAM INFORMATION

(71) Applicant: Sony Group Corporation, Tokyo (JP)

(72) Inventors: Basuki Priyanto, Lund (SE); Peter Karlsson, Lund (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 150 days.

(21) Appl. No.: 17/421,065

(22) PCT Filed: Jan. 10, 2020

(86) PCT No.: PCT/US2020/013045
§ 371 (c)(1),
(2) Date: Jul. 7, 2021

(87) PCT Pub. No.: WO2020/146711
PCT Pub. Date: Jul. 16, 2020

(65) Prior Publication Data
US 2022/0099785 A1 Mar. 31, 2022

(30) Foreign Application Priority Data
Jan. 11, 2019 (SE) .................................. 1930012-8

(51) Int. Cl.
*G01S 5/10* (2006.01)
*G01S 5/14* (2006.01)
*G01S 5/02* (2010.01)

(52) U.S. Cl.
CPC .......... *G01S 5/0268* (2013.01); *G01S 5/0244* (2020.05); *G01S 5/0273* (2013.01); *G01S 5/10* (2013.01); *G01S 5/14* (2013.01)

(58) Field of Classification Search
CPC .... G01S 5/0268; G01S 5/0244; G01S 5/0273; G01S 5/10; G01S 5/14
(Continued)

(56) References Cited

U.S. PATENT DOCUMENTS

2013/0033999 A1 2/2013 Siomina et al.
2016/0295366 A1 10/2016 Priyanto et al.
(Continued)

FOREIGN PATENT DOCUMENTS

EP 3306337 A1 * 4/2018 ............. G01S 1/042
EP 3306337 A1 4/2018
(Continued)

OTHER PUBLICATIONS

International Search Report and Written Opinion from corresponding International Application No. PCT/US2020/013045 dated Apr. 6, 2020, 21 pages.
(Continued)

*Primary Examiner* — Harry K Liu
(74) *Attorney, Agent, or Firm* — Tucker Ellis LLP (57) ABSTRACT

A wireless communications device (100) includes a wireless interface (122) for conducting wireless communications with one or more network nodes (110) of a wireless communications network (102). The wireless communications device (100) further includes a control circuit (118) configured to receive a plurality of reference signals transmitted by the one or more network nodes (110), measure the plurality of reference signals to generate a plurality of positioning measurements, associate the plurality of positioning measurements with beam information, and select a set of positioning measurements with associated beam information for determining a positioning estimate of the wireless communications device (100).

20 Claims, 7 Drawing Sheets

(58) Field of Classification Search
USPC .......................................................... 342/451
See application file for complete search history.

(56) References Cited

U.S. PATENT DOCUMENTS

| | | | |
|---|---|---|---|
| 2017/0108579 A1 | 4/2017 | Irvine et al. | |
| 2017/0359794 A1 | 12/2017 | Fischer | |
| 2017/0374637 A1* | 12/2017 | Akkarakaran | H04W 64/006 |
| 2017/0374640 A1 | 12/2017 | Kim et al. | |
| 2018/0324738 A1 | 11/2018 | Stirling-Gallacher et al. | |

FOREIGN PATENT DOCUMENTS

| | | |
|---|---|---|
| JP | 2013026926 A | 2/2013 |
| WO | 2015096809 A1 | 7/2015 |
| WO | 2017164925 A1 | 9/2017 |
| WO | 2018159967 A1 | 9/2018 |

OTHER PUBLICATIONS

Office Action from corresponding Swedish Application No. 1930012-8 dated Jun. 20, 2019.

\* cited by examiner

METHOD AND DEVICE FOR POSITIONING UTILIZING BEAM INFORMATION

RELATED APPLICATION DATA

This application claims the benefit of Swedish Patent Application No. 1930012-8, filed Jan. 11, 2019, the entirety of which is incorporated herein by reference.

TECHNICAL FIELD OF THE INVENTION

The technology of the present disclosure relates generally to operation of a wireless communications device in a wireless communications network and, more particularly, to a method and apparatus for utilizing beam information with positioning estimation.

BACKGROUND

In existing wireless communications systems (e.g., 3G or 4G-based systems), estimations of a device position are generally considered acceptable when regulatory positioning requirements are satisfied. For example, for emergency calls, a position estimate is only required to be accurate within 50 meters in 4G systems.

In legacy systems, such as 4G systems, timing measurements and angle measurements are common techniques for positioning. For instance, observed time difference of arrival (OTDOA) is a multilateration technique in 4G systems. In this technique, a base station (eNB) transmits positioning reference signals (PRS). A user equipment (UE) estimates time of arrival (TOA) based on the received PRS. The TOA measured from the PRS of multiple base stations are subtracted from a TOA corresponding to a reference base station to generate OTDOA measurements. The UE reports the OTDOA measurements or measured time difference (e.g. Reference Signal Time Difference (RSTD)) to a location server. The location server estimates the position of the UE based on the RSTD report and known coordinates of the base stations.

Another technique, such as Enhanced cell ID with LTE systems, involves a base station estimating an angle of arrival (AoA) of a signal transmitted by the UE. The base station exploits phase difference from at least two receive antennas to estimate the AoA, for example.

In general, these techniques provide satisfactory positioning when there are no multipath components and/or a line of sight condition is present. Multipath conditions, however, can result in wrong timing information being reporting, which in turn leads to inaccurate positioning.

Positioning is an important feature under consideration of the Third Generation Partnership Project (3GPP) for 5G systems such as New Radio (NR). The specification is targeting use cases beyond emergency call services (i.e. regulatory requirements), such as commercial use-cases and 5G systems may be expected to provide sub-meter positioning accuracy.

SUMMARY

The disclosed approach combines positioning measurements (e.g., timing-based and/or signal-strength-based) and beam information to enhance positioning accuracy. Positioning estimation error can be introduced with timing and/or angle-based measurements in non-line of sight or multipath conditions. Beam-based signal transmissions of 5G systems provide a directionality of transmissions. Accordingly, positioning measurements can be supplemented with beam-related information or parameters to improve accuracy.

According to one aspect of the disclosure, a method for providing beam-related information for positioning of a user equipment includes receiving a plurality of reference signals transmitted by one or more network nodes; generating a plurality of positioning measurements based on the plurality of reference signals; associating the plurality of positioning measurements with beam information; and selecting a set of positioning measurements with associated beam information to utilize for a positioning estimate.

According to one embodiment of the method, the method includes reporting the selected set of positioning measurements with associated beam information to a positioning computation node for estimating a position of the user equipment.

According to one embodiment of the method, the selected set of positioning measurements with associated beam information is reported in accordance with instructions received from a network node.

According to one embodiment of the method, the method includes estimating, by the user equipment, a position of the user equipment based on the selected set of positioning measurements with associated beam information.

According to one embodiment of the method, estimating the position of the user equipment is further based on positions of the one or more network nodes.

According to one embodiment of the method, selecting the set of positioning measurements with associated beam information is based on respective measurement results and measurement results quality for the plurality of positioning measurements.

According to one embodiment of the method, the positioning measurements are time-based measurements.

According to one embodiment of the method, the positioning measurements are signal strength-based measurements.

According to one embodiment of the method, the beam information includes a transmit beam and/or a receive beam for a respective reference signal.

According to one embodiment of the method, the beam information includes a beam index.

According to one embodiment of the method, the beam information includes an antenna panel index.

According to one embodiment of the method, the beam index relates to respective beam configurations of the one or more network nodes.

According to one embodiment of the method, each beam configuration specifies a reference direction and a maximum number of supported beams.

According to one embodiment of the method, the plurality of positioning measurements include measurements of multipath components of a transmission from a particular network node such that the method includes selecting one or more measurements of the multipath components for inclusion in the set of positioning measurements with associated beam information.

According to one embodiment of the method, selecting one or more measurements of the multipath components comprises selecting measurements based on predetermined quality criteria.

According to one embodiment of the method, associating includes employing a one-to-one mapping between positioning measurements and beam information.

According to one embodiment of the method, at least one of the positioning measurements or the beam information is reported in accordance with at least one of a device capability or a desired level of positioning accuracy.

According to another aspect of the disclosure, a wireless communications node configured to operate in a wireless communications network includes a wireless interface over which wireless communications with one or more network nodes are carried out; and a control circuit configured to: receive a plurality of reference signals transmitted by the one or more network nodes; measure the plurality of reference signals to generate a plurality of positioning measurements; associate the plurality of positioning measurements with beam information; and select a set of positioning measurements with associated beam information for determining a positioning estimate.

According to one embodiment of the wireless communications device, the control circuit is further configured to report the selected set of positioning measurements with associated beam information to a positioning computation node.

According to one embodiment of the wireless communications device, the control circuit is further configured to report the selected set of positioning measurements with associated beam information in accordance with instructions received from a network node.

According to one embodiment of the wireless communications device, the control circuit is further configured to estimate a position of the wireless communications device based on the selected set of positioning measurements with associated beam information and positions of the one or more network nodes.

According to one embodiment of the wireless communications device, the control circuit is further configured to select the set of positioning measurements with associated beam information based on respective measurement quality for the plurality of positioning measurements.

According to one embodiment of the wireless communications device, the plurality of positioning measurements include measurements of multipath components of a transmission from a particular network node and the control circuit is further configured to select one or more measurements of the multipath components for inclusion in the set of positioning measurements with associated beam information.

According to one embodiment of the wireless communications device, the control circuit is further configured to select the one or more measurements of the multipath components based predetermined quality criteria.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

Figure 1:
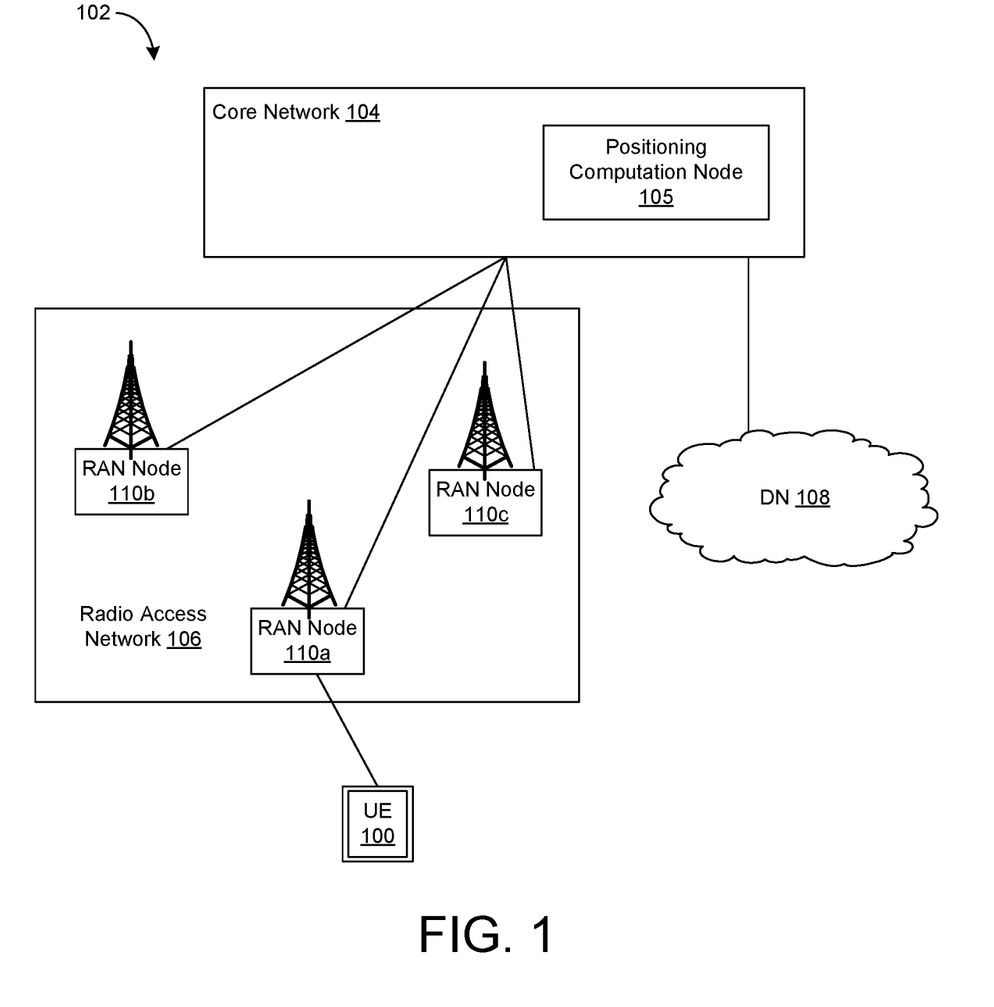
FIG. 1 is a schematic block diagram of a representative operational network environment for a wireless communications device, also referred to as a user equipment (UE).

FIG. 1 is a schematic diagram of an exemplary network environment in which the disclosed techniques are implemented. It will be appreciated that the illustrated network environment is representative and other environments or systems may be used to implement the disclosed techniques. Also, various functions may be carried out by a single device, such as by a radio access node, user equipment, or core network node, or may be carried out in a distributed manner across nodes of a computing environment.

The network environment is relative to an electronic, such a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, a camera, and an internet of things (IoT) device. Since aspects of the disclosed techniques may be applicable to non-3GPP networks, the UE 100 may be more generically referred to as a wireless communications device or a radio communications device.

The network environment includes a wireless communications network 102 that may be configured in accordance with one or more 3GPP standards, such as a 3G network, a 4G network or a 5G network. The disclosed approaches may apply to other types of networks. In one embodiment, the wireless communications network 102 may utilize beam-based signal transmissions, which may not be available in 3G or 4G networks.

In instances where the network 102 is a 3GPP network, the network 102 includes a core network (CN) 104 and a radio access network (RAN) 106. The core network 104 provides an interface to a data network (DN) 108. The DN 108 represents operator services, connection to the Internet, third party services, etc. Details of the core network 104 are omitted for simplicity of description, but it is understood that the core network 104 includes one or more servers that host a variety of network management functions, examples of which include, but are not limited to, a user plane function (UPF), a session management function (SMF), a core access and mobility management function (AMF), an authentication server function (AUSF), a network exposure function (NEF), a network repository function (NRF), a policy control function (PCF), a unified data management (UDM), an application function (AF), and a network slice selection function (NSSF). In addition, the core network 104 may include a positioning computation node 105 configured to estimate a position of UE 100 based on information reported by the UE 100, for example.

The RAN 106 includes a plurality of RAN nodes 110. In the illustrated example, there are three RAN nodes 110a, 110b, and 110c. Fewer than or more than three RAN nodes 110 may be present. For 3GPP networks, each RAN node 110 may be a base station such as an evolved node B (eNB) base station or a 5G generation gNB base station. The RAN node 110 may include one or more than one Tx/Rx point (TRP). Since aspects of the disclosed techniques may be applicable to non-3GPP networks, the RAN nodes 110 may be more generically referred to as network access nodes, an alternative example of which is a WiFi access point.

A radio link may be established between the UE 100 and one of the RAN nodes 110 for providing wireless radio services to the UE 100. The RAN node 110 to which the radio link is established will be referred to as the serving RAN node 110 or serving base station. Other RAN nodes 110 may be within communication range of the UE 100. The RAN 106 is considered to have a user plane and a control plane. The control plane is implemented with radio resource control (RRC) signaling between the UE 100 and the RAN node 110. Another control plane between the UE 100 and the core network 104 may be present and implemented with non-access stratum (NAS) signaling.

Figure 2:
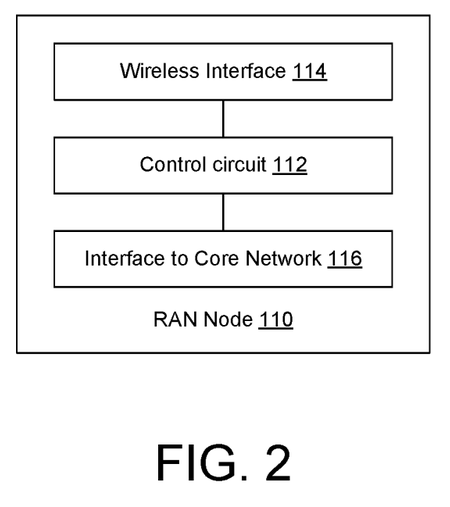
FIG. 2 is a schematic block diagram of a radio access network (RAN) node from the network environment.

With additional reference to FIG. 2, each RAN node 110 typically includes a control circuit 112 that is responsible for overall operation of the RAN node 110, including controlling the RAN node 110 to carry out the operations described in herein. In an exemplary embodiment, the control circuit may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 112 in order to carry out operation of the RAN node 110.

The RAN node 110 also includes a wireless interface 114 for establishing an over the air connection with the UE 100. The wireless interface 114 may include one or more radio transceivers and antenna assemblies to form the TRP(s). The RAN node 110 also includes an interface 116 to the core network 104. The RAN node 110 also includes an interface (not shown) to one or more neighboring RAN nodes 110 for conducting network coordination in the RAN 106.

Figure 3:
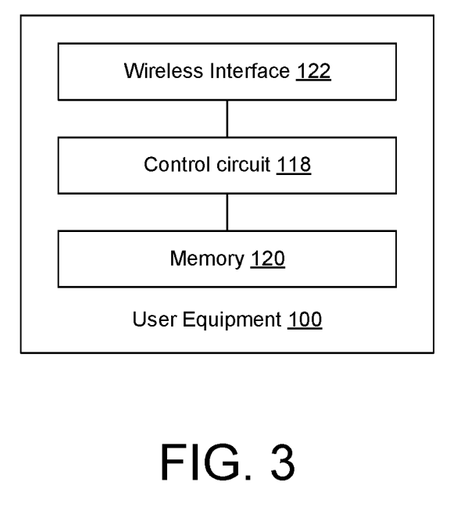
FIG. 3 is a schematic block diagram of the UE from the network environment.

With additional reference to FIG. 3, illustrated is a schematic block diagram of the UE 100. The UE 100 includes a control circuit 118 that is responsible for overall operation of the UE 100, including controlling the UE 100 to carry out the operations described herein. In an exemplary embodiment, the control circuit 118 may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 118 or a separate memory 120 in order to carry out operation of the UE 100.

The UE 100 includes a wireless interface 122, such as a radio transceiver and antenna assembly, for establishing an over the air connection with the serving base station 110. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Figure 4:
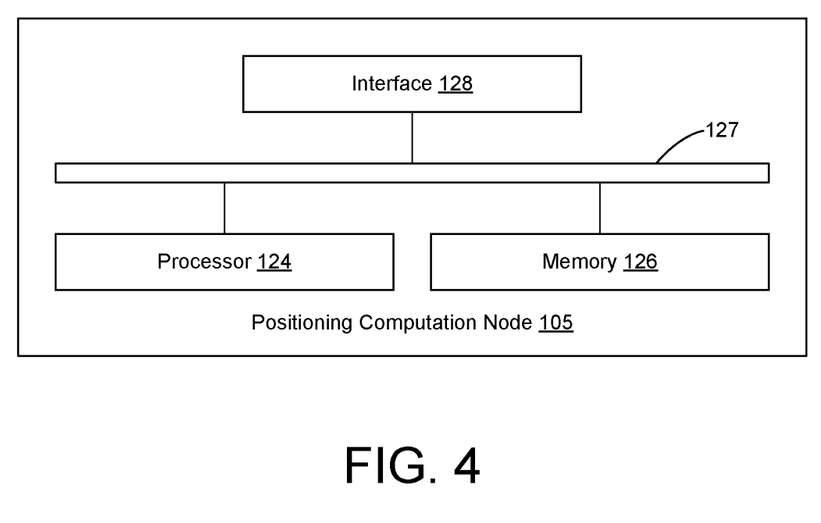
FIG. 4 is a schematic block diagram of a positioning computation node from the network environment.

In FIG. 4, a schematic block diagram of an exemplary embodiment of a positioning computation node 105 is illustrated. The positioning computation node 105 executes logical instructions (e.g., in the form of one or more software applications) to generate positioning estimates. It is to be understood, however, that aspects of the positioning computation node 105 may be distributed across various nodes of the core network 104 or another computing environment.

The positioning computation node 105 may be implemented as a computer-based system that is capable of executing computer applications (e.g., software programs) that carry out functions of the computation node 105. As is typical for a computer platform, the positioning computation node 105 may include a non-transitory computer readable medium, such as a memory 126 that stores data, information sets and software, and a processor 124 for executing the software. The processor 124 and the memory 126 may be coupled using a local interface 127. The local interface 127 may be, for example, a data bus with accompanying control bus, a network, or other subsystem. The computation node 105 may have various input/output (I/O) interfaces for operatively connecting to various peripheral devices, as well as one or more interfaces 128. The interface 128 may include for example, a modem and/or a network interface card. The communications interface 128 may enable the computation node 105 to send and receive data signals to and from other computing devices in the core network 104, the RAN 106, and/or in other locations as is appropriate.

Positioning Utilizing Beam Information

Techniques will be described for utilizing beam information in connection with other positioning techniques to improve accuracy. As described above, existing techniques may not provide desired accuracy, particularly in situations where multipath components are present. A combination of beam-related information with positioning measurements may reduce measurement error range. In addition, the combination of beam-related information and positioning measurements may enable computation of accurate positioning estimates with fewer than three base station (gNBs), which is the minimum for existing wireless communications systems.

Figure 5:
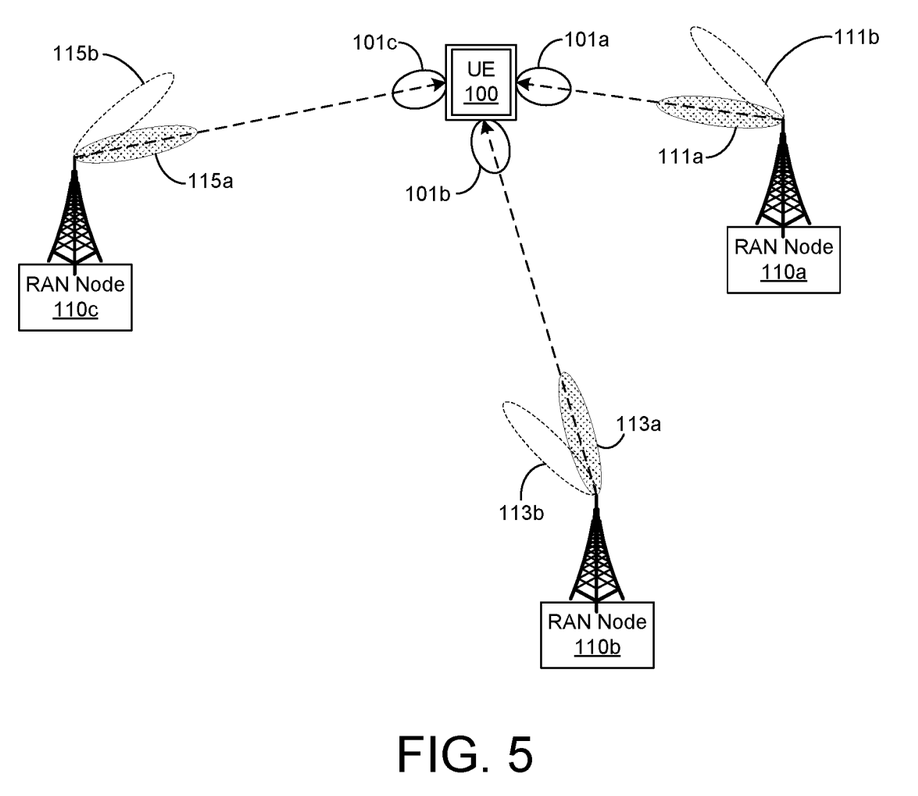
FIG. 5 is a schematic diagram of an exemplary positioning technique utilizing beam information.

Turning to FIG. 5, an exemplary embodiment of a positioning technique is illustrated. As shown in FIG. 5, UE 100 may receive one or more reference signals transmitted by one or more RAN nodes 110. The reference signals may be transmitted by the RAN nodes 110 via beam transmissions. For example, the RAN nodes 110 may employ beam sweeping to transmit reference signals on a set of configured beams. For instance, RAN node 110a may transmit a reference signal on beam 111a, 111b, and other configured beams according to a beam pattern. Similarly, RAN node 110b can transmit reference signals using beams 113a, 113b, etc. and RAN node 110c may transmit reference signals using beams 115a, 115b, and other configured beams. The reference signal, in one example, may be positioning reference signals (PRS) similar to PRS in existing communications systems. In another example, other existing signals generally utilized to assist data transmissions may be used for positioning purposes. For instance, channel state information—reference signal (CSI-RS), tracking reference signal (TRS), and/or synchronization signal block (SSB) may be utilized as reference signals for positioning purposes.

In FIG. 5, UE 100 may receive the reference signals from the RAN nodes 110 via respective receive beams 101a-c. The received reference signals may include multipath components of a particular transmission. UE 100 generates positioning measurements based on the received reference signals. The positioning measurements may be timing-based (e.g., TOA, OTDOA, etc.) and/or signal strength-based (e.g. reference signal received power (RSRP), received signal strength indication (RSSI), etc.). By way of example, for timing-based measurements, the UE 100 may determine a TOA based on a power delay profile, which may indicate presence of multipath components. In such cases, the UE 100 may keep timing measurements for components satisfying some criteria. For example, the UE 100 may keep timing measurements of components having normalized power above a predetermined threshold.

The UE 100 associates beam information with the positioning measurements. The association may be a one-to-one mapping. For example, the UE 100 may associate beam information related to beam 111a and/or beam 101a with the positioning measurement obtained based on the reference signal from RAN node 110a. The beam information may include a beam index that corresponds to a predetermined beam configuration for the RAN node 110 or UE 100, observed or estimated beam parameters (e.g. AoD, AoA, beam width, etc.), and/or an antenna panel index. For instance, an antenna panel may support multiple beams. To illustrate, UE 100 may have two panels, which each support four beams. Accordingly, the beam information may include the antenna panel index and the corresponding beam index. Thus, it is to be appreciated that UE capabilities influence the nature of the beam information associated. After associating a plurality of positioning measurements with beam information, UE 100 may select a set of measurements with associated beam information that will be employed to generate a positioning estimate. The selection may be based on the measurement results and/or respective qualities of the measurement results. Predetermined quality criteria may drive the selection by the UE 100. Alternatively, UE 100 may be configured with specific quality criteria by higher level signaling or a specific request. For example, UE 100 may be instructed by a RAN node 110 or CN 104 to limit a number of measurements to utilize for position estimation. Still further, the selection criteria may depend on the UE capabilities and/or a desired positioning accuracy.

According to one example, the selected measurements may include measurements exceeding some predetermined quality. For instance, for signal-strength-based measurements, measurements may be selected when the measured signal strength exceeds a threshold. For timing-based measurements, a shortest estimated timing with a normalized power above a threshold may be selected. In the presence of multipath components, additional variations may be available. For multipath components, measurements associated with additional components may be selected if the respective components satisfy the threshold condition. To illustrate, UE 100 may report a measurement associated with a shortest estimated timing when that component exceeds the threshold. If the shortest estimated timing does not exceed the threshold, the UE 100 may not select the measurement. Moreover, the UE 100 may select additional components (e.g. the second shortest estimated timing) if those components exceed the threshold. The threshold condition may incorporate ranges to account for conditions where a direct component may be substantially similar to a first order reflection, for example. Thus, if the shortest estimated timing is slightly below the threshold and a second shortest timing is also around the threshold, UE 100 may select both measurements.

In another aspect, the quality of a particular positioning measurement may be determined based on the associated beam information. For instance, the beam information associated with the positioning measurement may indicate a narrow beam width. The narrow beam width may minimize impact due to a multipath channel, which improves the accuracy of the measurement. Thus, the selection of positioning measurements for use in generating a positioning estimate may be based on criteria related to the associated beam information.

Still further, the quality of positioning measurements may be determined with respect to other positioning measurements. For example, a first positioning measurement may be derived from a first reference signal transmission from a first base station. The first measurement may indicate the UE 100 is in relatively close proximity to the first base station. A second positioning measurement based on a second reference signal transmission form a second base station may indicate the UE 100 is relatively farther away. Accordingly, UE 100 may select the first positioning measurement and discard the second positioning measurement. The beam information respectively associated with the first and second positioning measurements may be utilized to rank the first and second positioning measurements and, thus, increase the preference for the first measurement over the second measurement.

According to one embodiment, the UE 100 may utilize the selected set of positioning measurements with associated beam information to computer a positioning estimate. To support such UE-based estimation, UE 100 may be provided with coordinates or positions of RAN nodes 110 as well as respective beam configurations. Such information may be signaled to UE 100 via higher layer signal or other means.

In another embodiment, the UE 100 may report the selected set of positioning measurements with associated beam information to the positioning computing node 105 or a RAN node 110 (e.g. a serving base station). The positioning computation node 105 (or other node receiving the report from UE 100) may utilize the information contained in the report to generate the positioning estimate. The mapping of beam information to positioning measurements may be signaled to the positioning computation node 105 via higher layer signaling (e.g. LPP protocol). While FIG. 1 depicts the positioning computation node 105 being a core network node, it is to be appreciated that the functions performed by the positioning computation node described herein may be performed by a RAN node. Accordingly, as utilized herein, "positioning computation node" refers to any network node that computes a positioning estimate and may be include in the RAN, the core network, or another computing environment.

Figure 6:
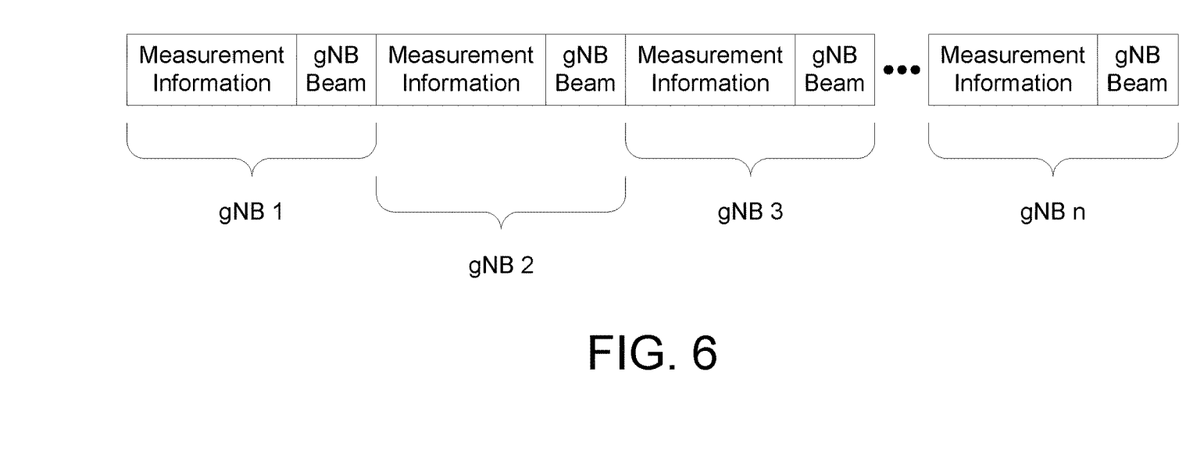
FIG. 6 is a schematic diagram of an exemplary report format to enable determination of a positioning estimate for the UE.
Figure 7:
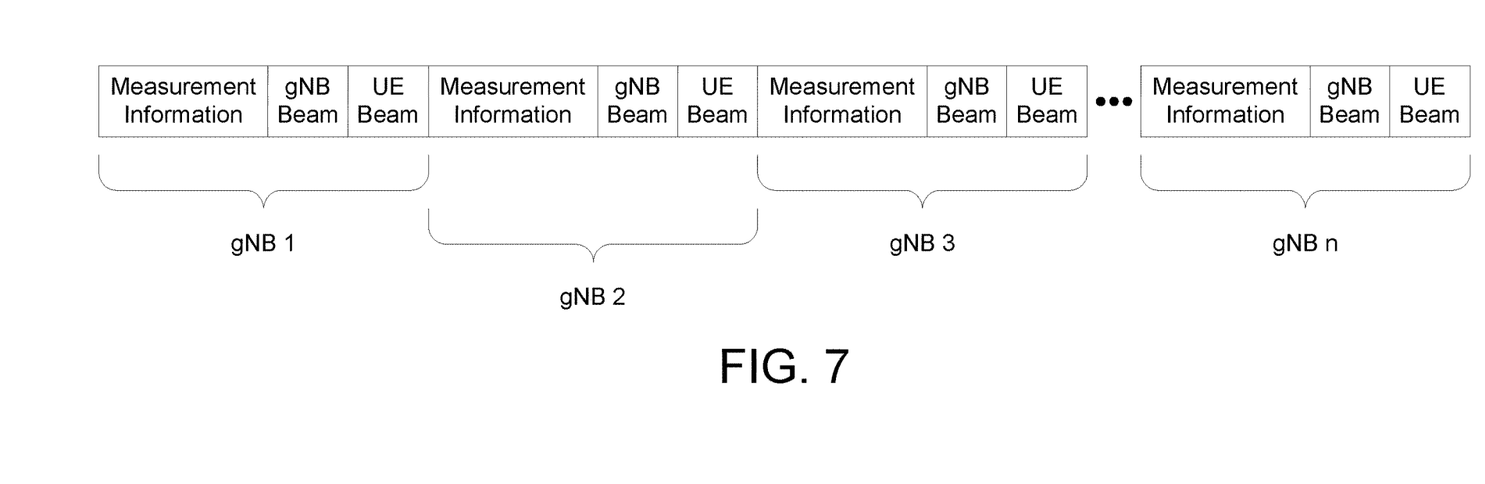
FIG. 7 is a schematic diagram of an exemplary report format to enable determination of a positioning estimate for the UE.
Figure 8:
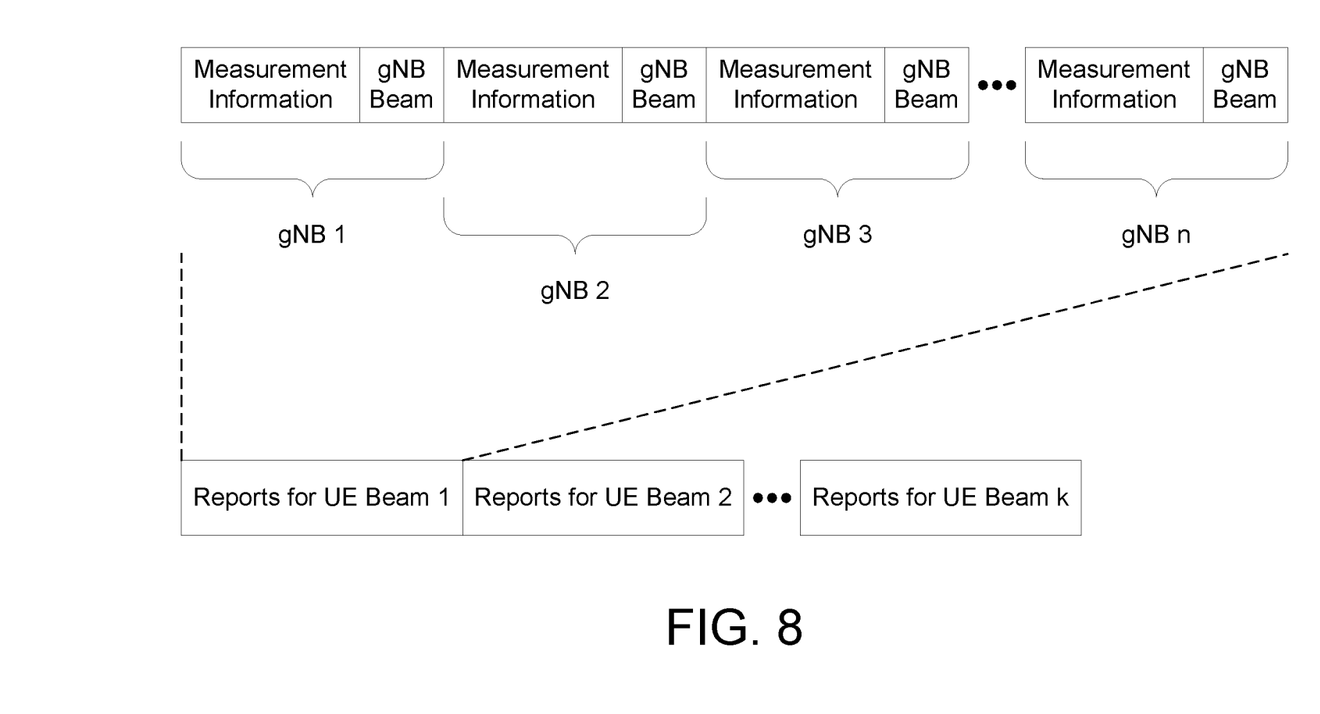
FIG. 8 is a schematic diagram of an exemplary report format to enable determination of a positioning estimate for the UE.

With reference to FIGS. 6-8, various exemplary report structures are illustrated that may be employed to report positioning information to the positioning computation node 105 or other node. In FIG. 6, measurement information and corresponding transmit beam (e.g. base station beam) is reported for each base station for which a reference signal is received, measured, and selected for reporting. When UE 100 is more capable in terms of beam operation, or a more accurate estimate is desired, UE 100 may utilize a report structure such as those shown in FIG. 7 or 8. In FIG. 7, UE 100 also reports a UE beam (e.g. a receive beam on which the reference signal is received) associated with the measurement information in addition to the base station beam. In FIG. 8, the UE 100 may provide a more thorough report to achieve higher positioning accuracy. As shown, the UE 100 may report, for each UE beam, multiple measurements and corresponding beam information for one or more base stations.

As described above, beam information may include a variety of beam-related information such as, but not limited to, a beam index that corresponds to a predetermined beam configuration for the RAN node 110 or UE 100, observed or estimated beam parameters (e.g. AoD, AoA, beam width, etc.), and/or an antenna panel index. For estimate beam parameters, the UE 100 may derive an actual angle (e.g., AoD, AoA) based on a detected beam index or other technique. The UE 100 may subsequently utilize the derived or estimated angle to computer a positioning estimate or the UE 100 may report the estimated angle. For reporting, the angle may be reported in a quantized form to reduce signaling bits. For example, if two bits are used, the UE 100 reports the angle in terms of 90 degree slices (i.e. 00→0 degrees, 01→90 degrees, 10→180 degrees, 11→270). In general, the number of bits utilized determines an accuracy of the reported angle. For example, with 8 bits, the angle is reported as a number of segments that each span 1.4 degrees. More generally, the accuracy of the angle estimate can be represented as $360/2^n$, where n is the number of bits utilized in reporting. It is to be understood that two angles (e.g. horizontal (azimuth) and vertical (elevation)) may be reported in order to specify a beam angle in three-dimensional space.

Figure 9:
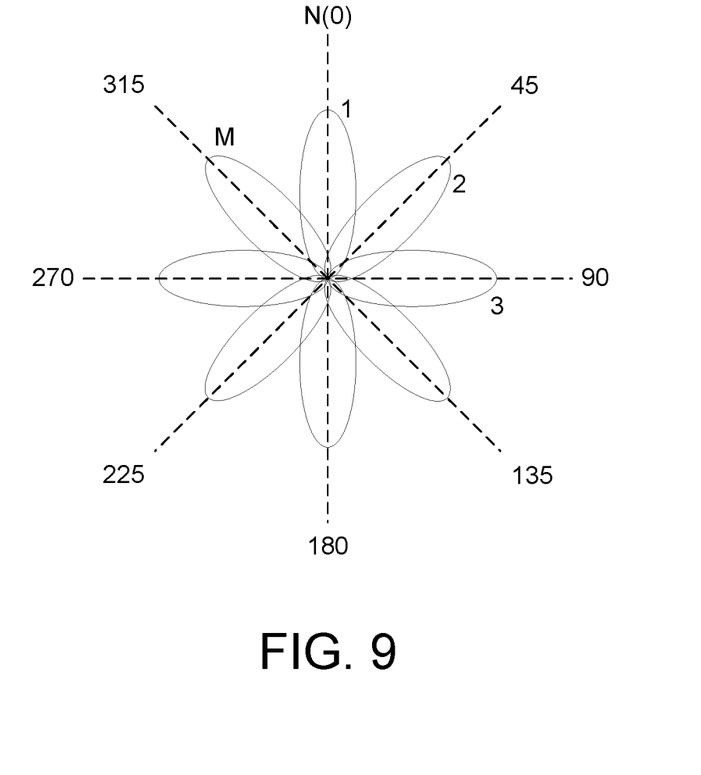
FIG. 9 is a diagram of an exemplary beam configuration for the RAN node.

Turning to FIG. 9, in accordance with a further aspect, the signaling and/or the beam information may be simplified using a predetermined beam configuration for a base station. For example, RAN node 110 can utilize a specific beam configuration that is aligned to a geographical reference direction (e.g. North). The alignment to the reference as well as a number of supported beams enables a geographical configuration of each beam to be determined. The number of supported beams provides a beamwidth. FIG. 9 illustrates an example where the number of beams is eight, with beam 1 aligned with geographical north. Accordingly, each beam has 45° of beamwidth. Given the alignment (e.g. the reference direction) and the number of beams, an angle of departure may be derived based on a reported beam index (e.g. beam 3, which corresponds to an AoD of) 90°. The UE 100 and/or the positioning computation node 105 may be informed of respective configuration for the RAN nodes 110 to facilitate positioning estimates. It is to be understood that the RAN nodes 110 may not always covers all directions (e.g. 360 degrees in the example of FIG. 9). Accordingly, the RAN nodes 110 may indicate their actual coverage by, for example, indicating active beam indices. While FIG. 9 illustrates a two-dimensional example, it is to be appreciated that a beam configuration may be three-dimensional in nature such that angles of departure for beams may have an elevation component and/or a beamwidth in the vertical dimension.

Figure 10:
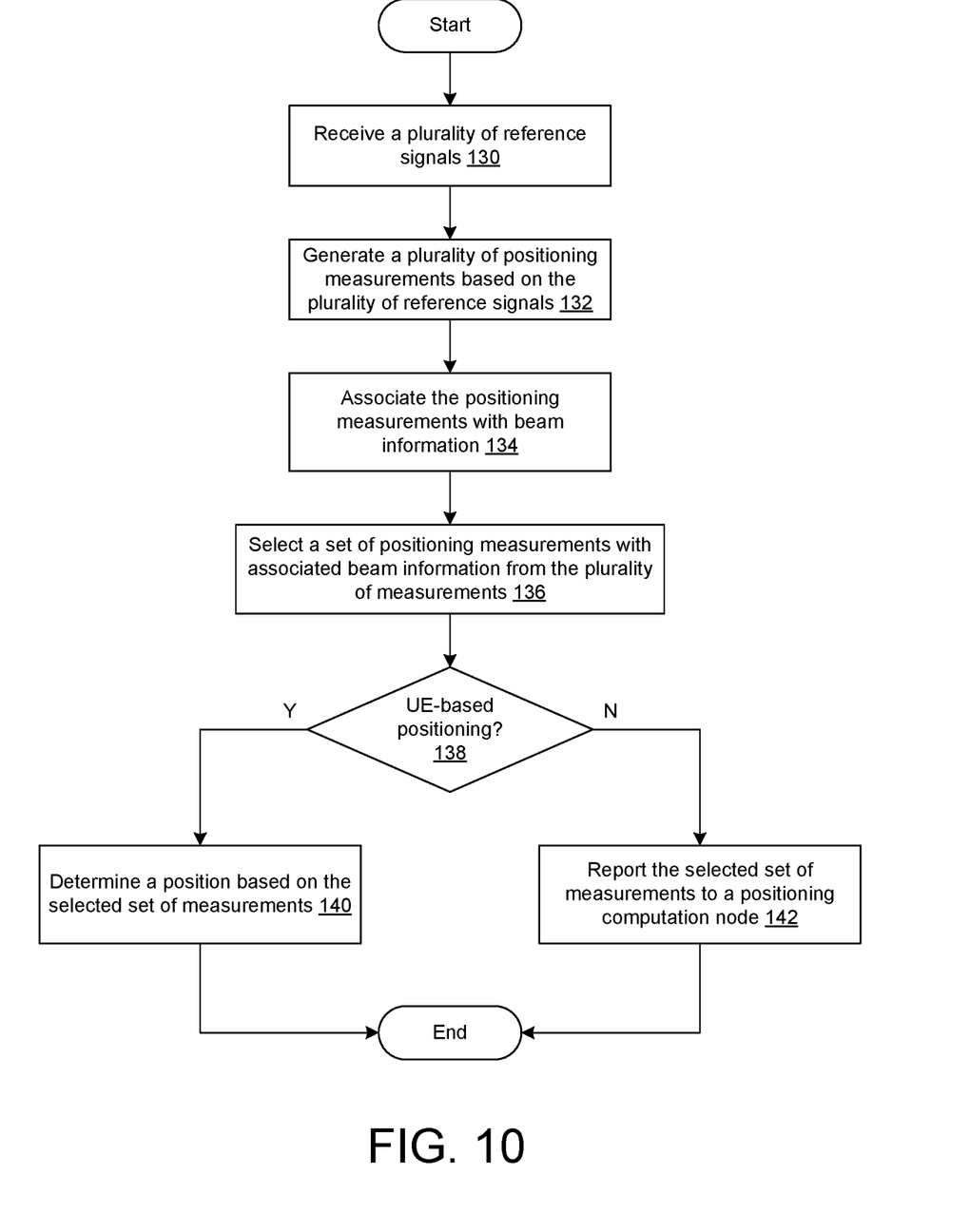
FIG. 10 is a flow diagram of a representative method of utilizing beam information in positioning.

FIG. 10 illustrates an exemplary process flow representing steps that may be embodied by UE 100. Complimentary operations of the core network 104, positioning computation node 105, and/or RAN node 110 will be understood from this disclosure. Although illustrated in a logical progression, the illustrated blocks of FIG. 10 may be carried out in other orders and/or with concurrence between two or more blocks. Therefore, the illustrated flow diagram may be altered (including omitting steps) and/or may be implemented in an object-oriented manner or in a state-oriented manner.

The logical flow may start at block 130 where the UE receives a plurality of reference signals. The plurality of reference signals may be transmitted by one or more base stations (e.g. RAN nodes, gNBs) and may include one or more multipath components of a transmission from a specific base station. In block 132, the UE generates a plurality of positioning measurements based on the plurality of reference signals. The positioning measurements may be timing-based or signal-strength-based as described above. In block 134, the UE associates the plurality of positioning measurements with beam information. The beam information may relate to base station beams (e.g. transmit beams) or UE beams (e.g. receive beams). In block 136, a set of measurements (with associated beam information) is selected from the plurality of measurements. The selection may be based on quality metrics based on the measurements themselves, the measurement in combination with the beam information, the beam information alone, and/or based on relative comparisons between measurements. In addition, the selection or filtering of measurements may occur in stages. For example, a first selection may initially occur following the measurements taken in block 132. The first selection may be based on respective quality of the measurements. As such, beam information may be associated in block 134 with measurements from the first selection. Following association, a second selection may occur that takes into account the beam information.

In block 138, the UE determines whether a UE-based positioning estimate is to be determined. If yes, the logical flow transitions to block 140 where a position of the UE is determined based on the selected set of measurements with associated beam information. If the estimate is not UE-based, the logical flow transitions to block 142 where the UE reports the selected set of measurements to a positioning computation node (e.g. a location server, a RAN node, or another core network node).

Conclusion

Although certain embodiments have been shown and described, it is understood that equivalents and modifications falling within the scope of the appended claims will occur to others who are skilled in the art upon the reading and understanding of this specification.

What is claimed is:

1. A method for providing beam-related information for positioning of a user equipment, comprising:
   receiving a plurality of reference signals transmitted by one or more network nodes;
   generating a plurality of positioning measurements based on the plurality of reference signals;
   associating the plurality of positioning measurements with beam information; and
   selecting a set of positioning measurements with associated beam information to utilize for a positioning estimate.

2. The method of claim 1, further comprising reporting the selected set of positioning measurements with associated beam information to a positioning computation node for estimating a position of the user equipment.

3. The method of claim 2, wherein the selected set of positioning measurements with associated beam information is reported in accordance with instructions received from a network node.

4. The method of claim 1, further comprising estimating, by the user equipment, a position of the user equipment based on the selected set of positioning measurements with associated beam information.

5. The method of claim 4, wherein estimating the position of the user equipment is further based on positions of the one or more network nodes.

6. The method of claim 1, wherein selecting the set of positioning measurements with associated beam information is based on respective measurement results and measurement results quality for the plurality of positioning measurements.

7. The method of claim 1, wherein the positioning measurements are at least one of time-based measurements or signal-strength-based measurements.

8. The method of claim 1, wherein the beam information includes a transmit beam and/or a receive beam for a respective reference signal.

9. The method of claim 1, wherein the beam information includes at least one of a beam index or antenna panel index.

10. The method of claim 9, wherein the beam index relates to respective beam configurations of the one or more network nodes, and
wherein each beam configuration specifies a reference direction and a maximum number of supported beams.

11. The method of claim 1, wherein the plurality of positioning measurements include measurements of multipath components of a transmission from a particular network node, wherein the method further comprises:
selecting one or more measurements of the multipath components for inclusion in the set of positioning measurements with associated beam information.

12. The method of claim 11, wherein selecting one or more measurements of the multipath components comprises selecting measurements based on predetermined quality criteria.

13. The method of claim 1, wherein the associating includes employing a one-to-one mapping between positioning measurements and beam information.

14. The method of claim 1, wherein at least one of the positioning measurements or the beam information is reported in accordance with at least one of a device capability or a desired level of positioning accuracy.

15. A wireless communications device configured to operate in a wireless communications network, comprising:
a wireless interface over which wireless communications with one or more network nodes are carried out; and
a control circuit configured to:
receive a plurality of reference signals transmitted by the one or more network nodes;
measure the plurality of reference signals to generate a plurality of positioning measurements;
associate the plurality of positioning measurements with beam information; and
select a set of positioning measurements with associated beam information for determining a positioning estimate.

16. The wireless communications device of claim 15, wherein the control circuit is further configured to report the selected set of positioning measurements with associated beam information to a positioning computation node.

17. The wireless communications device of claim 16, wherein the control circuit is further configured to report the selected set of positioning measurements with associated beam information in accordance with instructions received from a network node.

18. The wireless communications device of claim 15, wherein the control circuit is further configured to estimate a position of the wireless communications device based on the selected set of positioning measurements with associated beam information and positions of the one or more network nodes.

19. The wireless communications device of claim 15, wherein 10 the control circuit is further configured to select the set of positioning measurements with associated beam information based on respective measurement quality for the plurality of positioning measurements.

20. The wireless communications device of claim 15, wherein the plurality of positioning measurements include measurements of multipath components of a transmission from a particular network node, and
wherein the control circuit is further configured to select one or more measurements of the multipath components for inclusion in the set of positioning measurements with associated beam information based on predetermined quality criteria.

* * * * *